United States Patent
Komai et al.

(10) Patent No.: US 11,290,384 B2
(45) Date of Patent: Mar. 29, 2022

(54) ACCESS ORIGIN CLASSIFICATION APPARATUS, ACCESS ORIGIN CLASSIFICATION METHOD AND PROGRAM

(71) Applicant: Nippon Telegraph and Telephone Corporation, Tokyo (JP)

(72) Inventors: Yuka Komai, Tokyo (JP); Masahiro Kobayashi, Tokyo (JP); Shigeaki Harada, Tokyo (JP); Keisuke Ishibashi, Tokyo (JP); Ryoichi Kawahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/965,803

(22) PCT Filed: Feb. 7, 2019

(86) PCT No.: PCT/JP2019/004500
§ 371 (c)(1),
(2) Date: Jul. 29, 2020

(87) PCT Pub. No.: WO2019/159822
PCT Pub. Date: Aug. 22, 2019

(65) Prior Publication Data
US 2021/0051107 A1 Feb. 18, 2021

(30) Foreign Application Priority Data
Feb. 13, 2018 (JP) .............................. JP2018-023389

(51) Int. Cl.
*H04L 12/851* (2013.01)
*G06F 16/28* (2019.01)
(Continued)

(52) U.S. Cl.
CPC ........ *H04L 47/2408* (2013.01); *G06F 16/285* (2019.01); *H04L 41/142* (2013.01); *H04L 43/0882* (2013.01); *H04L 47/2441* (2013.01)

(58) Field of Classification Search
CPC .............. H04L 41/142; H04L 43/0882; H04L 47/2441; H04L 47/2408; G06F 16/285
(Continued)

(56) References Cited

U.S. PATENT DOCUMENTS 9,742,881 B2 * 8/2017 Chanda ................. H04L 49/354
9,848,374 B2 * 12/2017 Heikkila ............... H04L 43/028
(Continued)

FOREIGN PATENT DOCUMENTS

WO    WO-2016133064 A1 * 8/2016 ........... H04L 43/026

OTHER PUBLICATIONS

Komai et al., "Classification method of terminal environment focusing on commonality of utilization service," 2017 IEICE Communications Society Conference, Aug. 29, 2017, 74 pages (with English Translation).
(Continued)

*Primary Examiner* — Tauqir Hussain
(74) *Attorney, Agent, or Firm* — Fish & Richardson P.C.

(57) ABSTRACT

An access source classification apparatus has: a first calculation unit that calculates a statistic related to access to each service by each access source based on a set of access logs indicating access to any service of a plurality of services by any access source of a plurality of access sources; an extraction unit that, for each of the services, calculates an index value indicating distribution of access status to the service for each of the access sources based on the access logs related to the service, and extracts some services based on the index value; a second calculation unit that calculates relevance between each access source and each service
(Continued)

extracted by the extraction unit by applying a clustering approach to the statistic; and a classification unit that classifies an access source to any service extracted by the extraction unit into any of groups each including one or more access sources based on the relevance, thereby assisting improvement of efficiency in identifying the terminal type of an access source to a service.

10 Claims, 5 Drawing Sheets

(51) Int. Cl.

| | | |
|---|---|---|
| *H04L 12/24* | (2006.01) | |
| *H04L 12/26* | (2006.01) | |
| *H04L 47/2408* | (2022.01) | |
| *H04L 41/142* | (2022.01) | |
| *H04L 43/0882* | (2022.01) | |
| *H04L 47/2441* | (2022.01) | |

(58) Field of Classification Search
USPC .......................................................... 709/224
See application file for complete search history.

(56) References Cited

U.S. PATENT DOCUMENTS

| | | | | |
|---|---|---|---|---|
| 10,462,168 | B2* | 10/2019 | Shibahara | ............ H04L 63/1425 |
| 2015/0127783 | A1* | 5/2015 | Lissack | ............... G06F 9/45533 |
| | | | | 709/220 |
| 2016/0366159 | A1* | 12/2016 | Chiba | ................. H04L 63/1458 |
| 2018/0026862 | A1* | 1/2018 | Shimoda | ............... H04L 43/026 |
| | | | | 709/224 |

OTHER PUBLICATIONS

Yamashita et al., "A Consideration of the Passive OS Fingerprinting by DNS Traffic." 2012 IEIECE Communications Society Conference, Sep. 2012, p. 76, 3 pages (with English Translation).

* cited by examiner

|  | FQDN1 | FQDN2 | ... | FQDNn |
|---|---|---|---|---|
| USER IP ADDRESS 1 | 1 | 1 | ... | 0 |
| USER IP ADDRESS 2 | 0 | 0 | ... | 1 |
| ⋮ | ⋮ | ⋮ | ⋮ | ⋮ |
| USER IP ADDRESS N | 1 | 1 | ... | 0 |

Fig. 7

|  | 1ST FACTOR | 2ND FACTOR | ... | m-TH FACTOR |
|---|---|---|---|---|
| USER IP ADDRESS 1 | 0.6 | −0.2 | ... | 3.6 |
| USER IP ADDRESS 2 | 0.3 | 2.7 | ... | −1.4 |
| ⋮ | ⋮ | ⋮ | ⋮ | ⋮ |
| USER IP ADDRESS N | 1.8 | −0.4 | ... | 0.1 |

Fig. 8

|  | 1ST FACTOR | 2ND FACTOR | ... | m-TH FACTOR |
|---|---|---|---|---|
| USER IP ADDRESS 1 | 0 | 0 | ... | 1 |
| USER IP ADDRESS 2 | 0 | 1 | ... | 0 |
| ⋮ | ⋮ | ⋮ | ⋮ | ⋮ |
| USER IP ADDRESS N | 1 | 0 | ... | 0 |

Fig. 9

ACCESS ORIGIN CLASSIFICATION APPARATUS, ACCESS ORIGIN CLASSIFICATION METHOD AND PROGRAM

CROSS-REFERENCE TO RELATED APPLICATIONS

This application is a National Stage application under 35 U.S.C. § 371 of International Application No. PCT/JP2019/004500, having an International Filing Date of Feb. 7, 2019, which claims priority to Japanese Application Serial No. 2018-023389, filed on Feb. 13, 2018. The disclosure of the prior application is considered part of the disclosure of this application, and is incorporated in its entirety into this application

TECHNICAL FIELD

The present invention relates to an access source classification apparatus, an access source classification method, and a program.

BACKGROUND ART

In recent years, in network operators dealing with traffic on the Internet, there has been a need to sequentially monitor the status of the network and perform suitable communication control and facility planning in order to avoid degradation of communication quality due to congestion in the network.

In particular, it is important to grasp factors of generation of traffic in detail as a basis for performing suitable communication control and facility planning. Since there are application updates or a use tendency of services specific to a used terminal type, it is effective to grasp the used terminal type of a user (client) in grasping factors of generation of traffic.

As a representative approach for grasping the used terminal type of a user, there is a scheme for traffic collection and analysis based on DPI (deep packet inspection). DPI is a measurement scheme that refers to header information in a communication application. In particular, in HTTP communication, the used terminal type can be identified by referring to a user agent included in the header.

However, due to the high cost of a DPI apparatus, it is difficult for network operators with a large amount of communication traffic to perform exhaustive monitoring. Furthermore, since DPI is a scheme that refers to a data storage area (payload) in communication, it may be difficult to implement due to service agreement or the like depending on network operators. In addition, when the payload is encrypted such as in HTTPS communication, it is difficult to refer to the user agent by DPI.

In order to solve the above problem, there has been proposed a scheme for collecting DNS queries, and estimating the number of terminals on which a specific OS (operating system) is mounted (see, e.g., Non-Patent Literature 1). This scheme monitors DNS traffic in the vicinity of a DNS server in the network without deploying apparatuses for network monitoring throughout the network, and uses characteristics of each OS observed in DNS queries to estimate the number of terminals for each mounted OS. Each OS has a unique domain to which other OSs do not transmit DNS queries, and a DNS query for the domain has a characteristic of being transmitted at a certain time interval. Therefore, the number of terminals on which a specific OS is mounted is estimated based on the transmission cycle in the domain unique to the OS grasped in advance. At this time, the number of terminals can be estimated even when the transmission cycle is shifted from the expected one.

CITATION LIST

Non-Patent Literature

Non-Patent Literature 1: "A Consideration of the Passive OS Fingerprinting by DNS Traffic", T. Matsunaka, A. Yamada, and A. Kubota, Communication Society Conference 2012 of the Institute of Electronics, Information and Communication Engineers, B-6-76, September 2012.

SUMMARY OF THE INVENTION

Technical Problem

However, the scheme of Non-Patent Literature 1 needs to grasp the domain unique to the OS in advance. In addition, although the scheme of Non-Patent Literature 1 needs to acquire the transmission cycle in the unique domain in advance for use as a parameter, Non-Patent Literature 1 has reported that the transmission cycle varies when manufacturing vendors are different even when the OSs are the same, so the transmission cycles must be checked for all terminal types to be estimated. For these reasons, it is necessary to preliminarily check all terminals to be identified, and to make an additional check each time a new terminal appears because of the launch of a new product, so it is inefficient to perform identification based on a complete census such as the approach described in Non-Patent Literature 1.

The present invention has been made in view of the above points, and aims at assisting improvement of efficiency in identifying the terminal type of an access source to a service.

Means for Solving the Problem

Therefore, in order to solve the above problems, an access source classification apparatus includes: a first calculation unit that calculates a statistic related to access to each service by each access source based on a set of access logs indicating access to any service of a plurality of services by any access source of a plurality of access sources; an extraction unit that, for each of the services, calculates an index value indicating distribution of access status to the service for each of the access sources based on the access logs related to the service, and extracts some services from the plurality of services based on the index value calculated for each of the services; a second calculation unit that calculates relevance between each access source and each service extracted by the extraction unit by applying a clustering approach to the statistic; and a classification unit that classifies an access source to any service extracted by the extraction unit into any of groups each including one or more access sources based on the relevance.

Effects of the Invention

It is possible to assist improvement of efficiency in identifying the terminal type of an access source to a service.

DESCRIPTION OF EMBODIMENTS

An embodiment of the present invention will be described below based on the drawings. First, each term used in this embodiment is defined as follows.

Both terms of "communication" and "traffic" are synonymous with "communication traffic", and refer to communication data flowing on a network.

"Terminal type" refers to an operation system (OS) mounted on a terminal (a user terminal 30 described later) that is an access source to a service, or the form of the user terminal 30 (e.g., desktop PC, note PC, or mobile terminal).

"DNS query" refers to a query in performing name resolution (processing for acquiring a corresponding IP address from a domain name using DNS) from the user terminal 30 to a DNS (domain name system) server.

"Access" refers to occurrence of communication in the user terminal 30.

"Service" is a service provided by a content distributor. This is provided by a content service provider (CSP) using a server.

This embodiment pays attention to the presence of a correlation between the terminal type of an access source to a service and the used service. This embodiment analyzes access logs to services observed in a certain period of time based on correlations between the access sources and the used services to classify the access sources based on similarity among the terminal types.

Based on such classification, the terminal type of the user terminal 30 used by a user can be identified or estimated. Specifically, by performing grouping based on access sources of the same terminal type, it possible to grasp the behavior of the whole group by tracking features of some access sources in the group even when the number of access sources is very large.

Thereby, even when a new user terminal 30 has appeared, the user terminal 30 is expected to belong to an already-identified group if it has the same feature as an existing user terminal 30 (access source), so an additional check becomes unnecessary. Only when a new user terminal 30 has appeared and thereby the number of user terminals 30 belonging to an unidentifiable group has increased, the user terminal 30 is checked, so that efficiency is improved.

Figure 1:
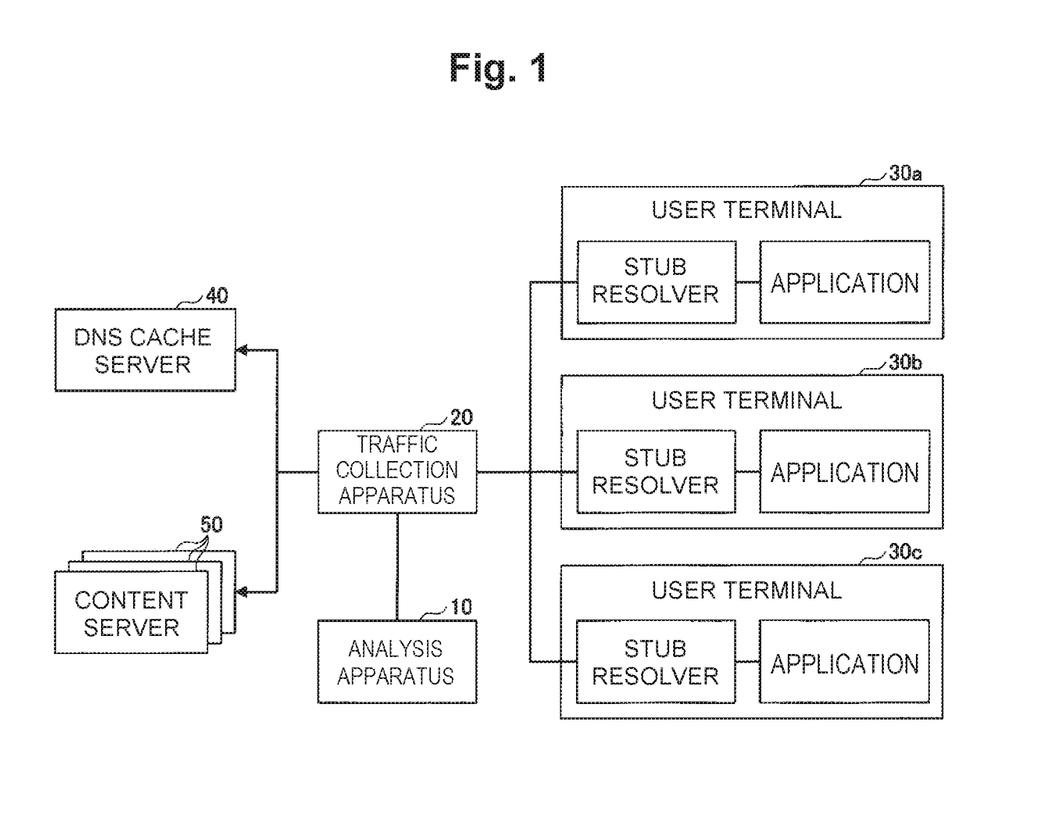
FIG. 1 is a diagram showing an example system configuration in an embodiment of the present invention.

FIG. 1 is a diagram showing an example system configuration in the embodiment of the present invention. In FIG. 1, a plurality of user terminals 30 such as a user terminal 30a, a user terminal 30b, and a user terminal 30c are connected to a DNS cache server 40, one or more content servers 50, and the like via a network such as a LAN (local area network) or the Internet. The DNS cache server 40 is a common DNS cache server 40. The content servers 50 are computers that provide services to the user terminals 30. One content server 50 may provide a plurality of services.

A traffic collection apparatus 20 is arranged to be able to refer to communication traffic between the user terminals 30 and the DNS cache server 40 or the content servers 50. The traffic collection apparatus 20 collects and accumulates communication logs (hereinafter referred to as "access logs") including, for example, access from a user terminal 30 to a service (a content server 50). An access log to a service is not limited to a log related to direct traffic to the service. For example, a log of DNS queries, a log of a DNS cache, or the like may be used as an access log. The traffic collection apparatus 20, for example, may be inserted on a network line connecting the user terminals 30 and the DNS cache server 40 and the content servers 50 like a gateway apparatus of the network, or may be installed in a form of being externally attached by a method such as tapping or mirroring. The point of collecting access logs is not especially limited as long as it satisfies a condition of including communication between the user terminals 30 and the servers, and for example, access logs may be collected at the content servers 50, the DNS cache server 40, or the like. That is, these servers may double as the traffic collection apparatus 20.

An analysis apparatus 10 is connected to the traffic collection apparatus 20 via a network such as a LAN or the Internet. The analysis apparatus 10 refers to and analyzes the access logs accumulated in the traffic collection apparatus 20 to output an analysis result. Note that although this embodiment describes an example in which the traffic collection apparatus 20 and the analysis apparatus 10 are configured as separate apparatuses, the traffic collection apparatus 20 and the analysis apparatus 10 may be implemented using the same general-purpose computing apparatus (computer).

Figure 2:
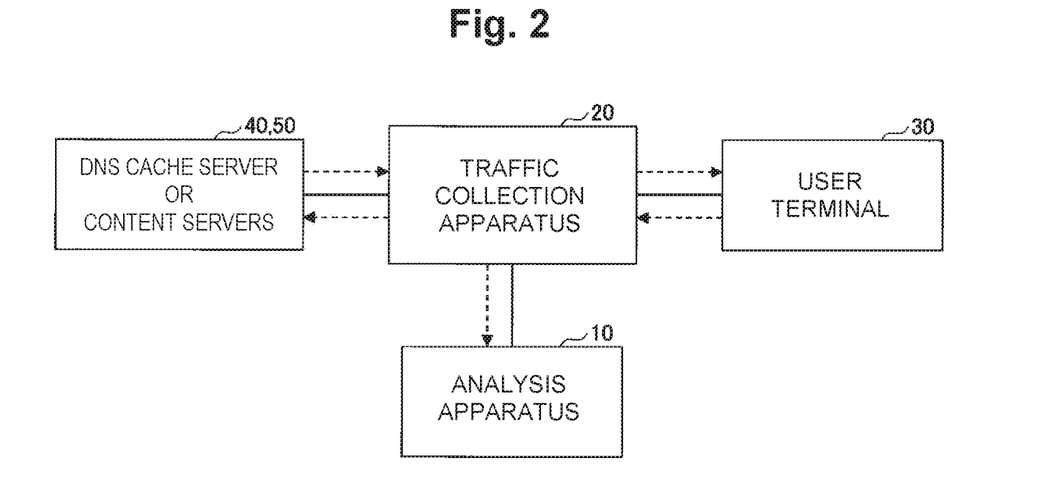
FIG. 2 is a diagram showing an example operation of a traffic collection apparatus 20.

FIG. 2 is a diagram showing an example operation of the traffic collection apparatus 20. In FIG. 2, the traffic collection apparatus 20 collects and accumulates access logs without affecting any communication over the network. Although a recording destination of the access logs is assumed to be a main memory or a recording apparatus of the traffic collection apparatus 20, it is optional. In this embodiment, access logs are collected in the following format.

TABLE 1

| time stamp | user ID | service name | (observed value) |
| --- | --- | --- | --- |

The time stamp is the date and time when the user terminal 30 accessed the service. The user ID is an identifier (e.g., IP address) of the user terminal 30 that is the access source. The user ID and the user terminal 30 are not necessarily in one-to-one relation here. This is because, for example, a plurality of user terminals 30 can share the same IP address. In this embodiment, such a situation is also allowed. The service name is an identifier of the service that is the access destination. Specifically, a host name in the case of HTTP traffic, and FQDN (fully qualified domain name) in the case of a DNS query are an example of the service name. The observed value is a value that can be observed when the user terminal 30 accesses the service. For example, in the case of a log of direct traffic for the service, a traffic amount generated in the corresponding communication can be used as this observed value. However, this observed value is optional, the observed value can be omitted to form the access log.

Figure 3:
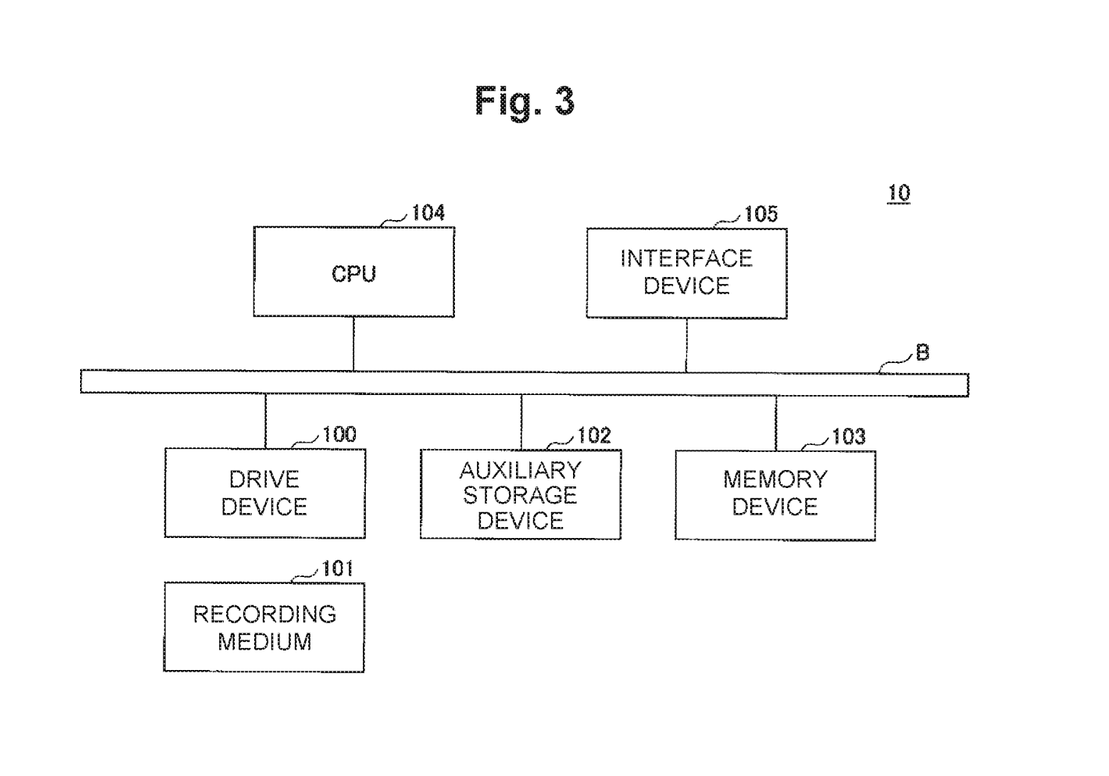
FIG. 3 is a diagram showing an example hardware configuration of an analysis apparatus 10 in the embodiment of the present invention.

FIG. 3 is a diagram showing an example hardware configuration of the analysis apparatus 10 in the embodiment of the present invention. The analysis apparatus 10 in FIG. 3 has a drive device 100, an auxiliary storage device 102, a memory device 103, a CPU 104, an interface device 105, and the like that are connected to each other via a bus B.

A program for implementing processing in the analysis apparatus 10 is provided using a recording medium 101 such as a CD-ROM. When the recording medium 101 storing the program is set in the drive device 100, the program is installed in the auxiliary storage device 102 from the recording medium 101 through the drive device 100. However, the program need not necessarily be installed using the recording medium 101, and may be downloaded from another computer via the network. The auxiliary storage device 102 stores the installed program, as well as necessary files, data, and the like.

Upon an instruction to run the program, the memory device 103 reads the program from the auxiliary storage device 102 for storage. The CPU 104 executes a function related to the analysis apparatus 10 according to the program stored in the memory device 103. The interface device 105 is used as an interface for connecting to the network.

Figure 4:
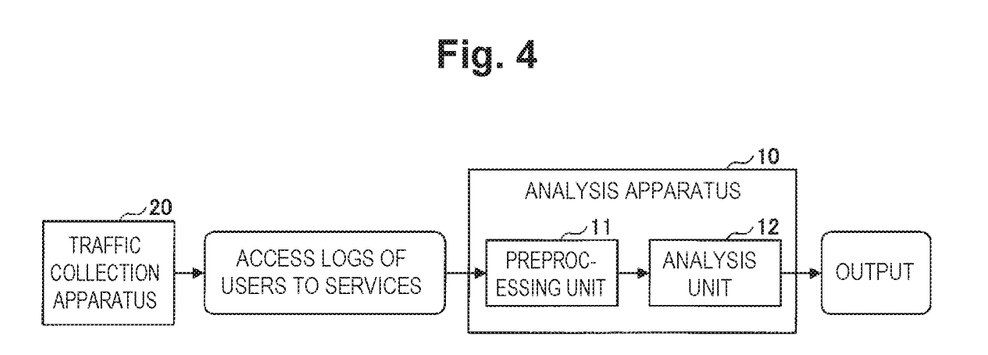
FIG. 4 is a diagram showing an example functional configuration of the analysis apparatus 10 in the embodiment of the present invention.

FIG. 4 is a diagram showing an example functional configuration of the analysis apparatus 10 in the embodiment of the present invention. In FIG. 4, the analysis apparatus 10 has a preprocessing unit 11, an analysis unit 12, and the like. Each of these units is implemented by processing that one or more programs installed in the analysis apparatus 10 cause the CPU 104 to execute.

The preprocessing unit 11 processes the access logs into data suitable for analysis for the purpose of classification and identification of the terminal type of each user ID.

The analysis unit 12 analyzes the processed data as input data to cluster the user IDs.

Figure 5:
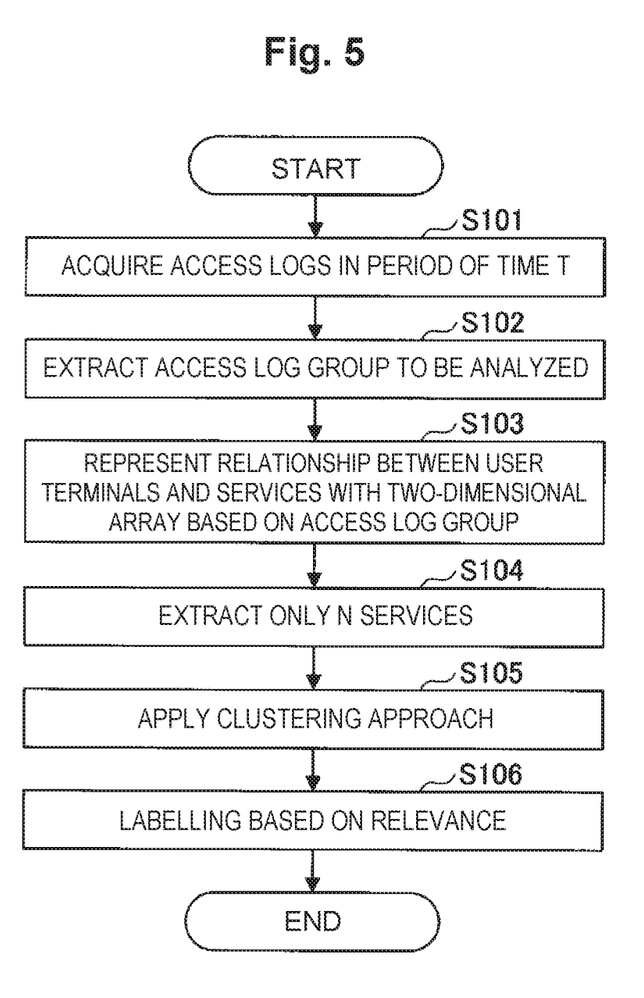
FIG. 5 is a flowchart for explaining an example processing procedure executed by the analysis apparatus 10.

A processing procedure executed by the analysis apparatus 10 will be described below. FIG. 5 is a flowchart for explaining an example processing procedure executed by the analysis apparatus 10.

In step S101, the preprocessing unit 11 acquires a set of access logs in a period of time T (=an end time Te–a start time Ts) from the traffic collection apparatus 20 with reference to the time stamps. T is any numerical value that is set in advance a person who performs analysis. The shorter T is, the more the user terminals 30 used in the corresponding time span can be grasped. However, when a user owns a plurality of user terminals 30 but does not use them simultaneously in T, this is insufficient in terms of exhaustively grasping the user terminals 30 used by the user. On the other hand, when T is set longer, it is considered possible to grasp the use of the plurality of terminals by the user, but the amount of necessary data increases, and cost for collection and analysis increases. Here, the use of the user terminals 30 by the user is considered to have periodicity. For example, a smartphone is used in the morning and a PC is used in the evening, or only the smartphone is used on weekdays and a desktop PC is used on holiday. Therefore, T is preferably determined in view of periodicity such as one day or one week.

Subsequently, the preprocessing unit 11 extracts an access log group to be analyzed from the acquired set of access logs (S102).

In order to cluster access sources based on the terminal types of the access sources to services, it is effective to use access logs of services by narrowing down to services relevant to the terminal types. On the other hand, the services include a service that is accessed from a plurality of different terminal types, and is less relevant to a particular terminal type. By excluding access logs related to such a service from the acquired set of access logs, improvement of the accuracy of clustering can be expected.

Here, services relevant to a terminal type include, for example, update programs of the OS and services related to NTP (network time protocol), and are considered to often be services autonomously accessed by the terminal. Services less relevant to terminal types include, for example, search services and SNSs (social networking services) accessed from a plurality of different terminal types, and are considered to often be services intendedly used (accessed) by the users, that is, services strongly relevant to user behavior.

When a user terminal 30 performs autonomous access, an access count or an access interval to a service in the certain period of time (T) is likely to be about, the same among user IDs, such as access at a certain interval. On the other hand, when there is strong relevance to user behavior, the access count or interval is considered to be largely different depending on users (the usage of a service is different depending on users). From this, the strength of relevance between a service and a terminal type can be estimated from the distribution of the access count or interval for each user ID with respect to each service.

So, first of all, the preprocessing unit 11 retrieves, for each service name, access logs including the service name (referred to as "service name z") from the acquired set of access logs, and calculates the access count (or interval) $h_{z,r}$ (r: each user ID that accessed the service z) for each user ID with respect to the retrieved access logs. The preprocessing unit 11 calculates a feature value $\sigma_z$, which is an example of an index value representing the distribution of access status to the service name z for each user ID (for each access source), based on the distribution of $h_{z,r}$ calculated for each user ID with respect to the service name z. It is sufficient to use for example, the variance or the standard deviation as the feature value $\sigma_z$.

When $\sigma_z$ is equal to or less than a threshold y, the preprocessing unit 11 adds access logs including the service name z to the "access log group". The threshold y is determined in advance, and for example, the median of all the calculated $\sigma_z$ may be used.

Subsequently, the preprocessing unit 11 generates a two-dimensional array that represents relationship between the user terminals 30 (strictly, user IDs) and the services based on the extracted access log group (S103). The two-dimensional array is data in which the user ID of each user terminal 30 is an item of the vertical axis, each service name is an item of the horizontal axis, and a statistic obtained from the access log group is an element. A service used by a user terminal 30 is considered to have a feature or pattern associated with (correlated with) the terminal type, and it is necessary to calculate the elements of the array suitable for clustering user terminals 30 (user IDs) similar in this pattern. A statistic v of a certain user ID u for a certain service s may be calculated by, for example, any of the following methods (1)-(3):

(1) When clustering is performed based on a use relationship between a user ID and a service,
   v=binary(count(access logs of user ID=u and service name=s)).

(2) When clustering is performed based on a user ID and usage of a service, v=process(count (access logs of user terminal ID=u and service name=s)).

(3) When clustering is performed based on observed values,
v=process(sum (observed values of access logs of user ID=u and service name=s)).

Note that binary(x)=1 (x>0), and 0 (x=0) count ( ) is the number of corresponding access logs sum ( ) is the sum of corresponding values, process ( ) is an operation for outputting an input value while keeping magnitude relationship, and for example, process (x)=x, process (x)=log(x) or the like is conceivable.

(1) represents, by 1/0, the presence/absence of access to a service an access source of which is the user ID. (2) is an access count to the service an access source of which is the user ID. (3) is a total amount of traffic (traffic amount) that is generated when using a service an access source of which is the user ID.

Figure 6:
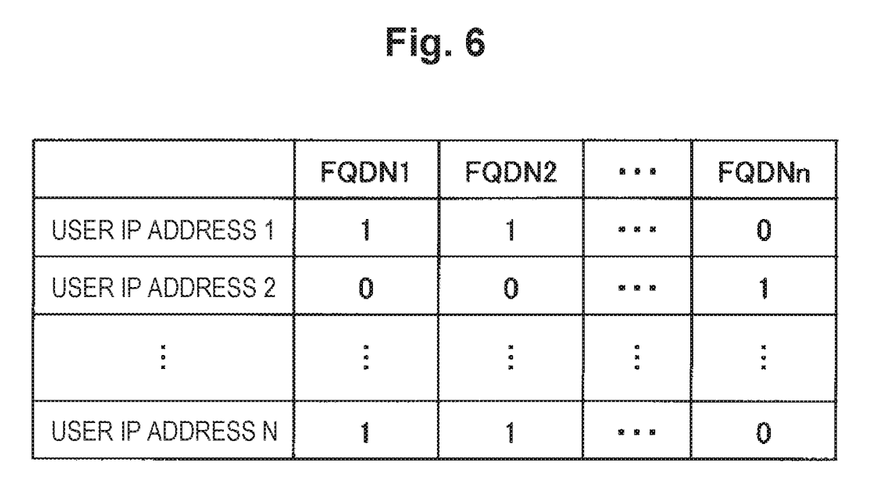
FIG. 6 is a diagram showing an example two-dimensional array.

FIG. 6 is a diagram showing an example two-dimensional array. FIG. 6 shows an example two-dimensional array generated by the above method (1). Note that in FIG. 6, an IP address of a user terminal 30 is used as an example of a user ID, and FQDN is used as an example of a service name.

Subsequently, the preprocessing unit 11 extracts only n services having a relatively large sum of the statistics (S104). When there are so many types of services, problems may occur such as an increase in a calculation time required for analysis, and difficulty in interpreting an analysis result. Therefore, in order to cluster user IDs based on features or patterns associated with the terminal types, it is effective to extract and analyze useful data in advance. That is, it is considered preferable to narrow down the number of services to be analyzed. The number n of services to be analyzed can be optionally determined. However, a significant decrease in the number of user IDs to be analyzed due to narrowing down the number of services should be avoided. Therefore, as an example, a method is employed for determining n by introducing a user coverage C representing the percentage or user IDs that are access sources to p or more services with respect to n specified services among all user IDs in the access log group. Since a larger user coverage C represents analysis for more user IDs, n is determined so that the user coverage C may be equal to or greater than a certain threshold "threshold" determined in advance.

Here, used services are known to be biased, for example, major services are used by many users, while most services are used by only a few users. A service used by many users is more likely to be useful because it more represents relevance between the users (user IDs) and the service. Therefore, for example, it is sufficient to arrange services in order from a service with a larger sum of elements of the array for each service, and then narrow down to only n services (top k to (k+n−1) services) that satisfy a condition that the user coverage C is equal to or greater than the threshold. Although step S104 is not an essential process, it is considered to enable reduction of the size of data and effective analysis, so it is recommended to be performed when there are many types of services and many users can be covered only by services having many statistics.

For example, the following is a pseudo code for extracting n services:

```
1: [INPUT: two-dimensional array A (the number N of users
   × the total number of services), k (natural number), p
   (natural number of n or less), threshold]
2: Sort service columns in A
3: i = k, C=0
4: While(C<threshold) {
5:      C = count users(count(each value in k-th to i-th
        services > 0) ≥ p) / N
6:      A' = add (i-th service columns from A)
7:      i = i+1
8:}
9:[OUTPUT: two-dimensional array A' (the number N of user
   terminals 30 × n), where n = i−k]
```

"x:" (x=1 to 9) at the head of each line of the above pseudo code is a line number that is given for convenience of explanation. The first line means that a two-dimensional array A as shown in FIG. 6, k, p, and a threshold are given (input) as input parameters.

The second line means that the columns in the two-dimensional array are sorted in the descending order of the sum of the elements in each column. The third line means that a variable i is initialized by k, and the user coverage C is initialized by 0.

The fourth line means that the fifth to seventh lines are repeated while C is less than the threshold. In the fifth line, "count (each value in k-th to i-th services >0)" means that the number of values greater than 0 in the k-th to i-th services (columns) is counted, and "count users (count (each value in k-th to i-th services >0) ≥p)" means that the number of user IDs with the counted value equal to or greater than p is counted. Furthermore, "C=count users (count (each value in k-th to i-th services >0) ≥p)/N" means that a value obtained by dividing the count result of the number of the user IDs by N is substituted for C.

The sixth line means that the i-th service (column) in the two-dimensional array A is added to the two-dimensional array A'. The seventh line means that 1 is added to i.

Since step S102 is independent of step S103 and step S104, step S102 may be performed after step S104 is performed. In that case, a set of all access logs acquired in step S101 is defined as the access log group, step S103 and S104 are performed, thereafter a feature value $\sigma_z$ explained with respect to step S102 is calculated, and only columns having a service name z in which $\sigma_z$ is equal to or less than y in the two-dimensional array A' may be extracted.

Subsequently, the analysis unit 12 applies a clustering approach using data processed in the preprocessing unit 11 (the two-dimensional array A' in the pseudo code) as input data (S105).

Here, any approach can be applied as the clustering approach, such as factor analysis or NMF (non-negative matrix factorization), as long as it is an approach capable of grouping user IDs with the two-dimensional array as input. For factor analysis, for example, "Survey on Independent Component Analysis, Aapo Hyvarinen, Neural Computing Surveys 2, pp. 94-128, 1999." may be referred to. For NMF, for example, "Document Clustering Based on Non-negative Matrix Factorization, Wei Xu, Xin Liu, and Yihong Gong, Proc. of Int'l ACM SIGIR Conf. on Research and Development in Information Retrieval, pp. 267-273, 2003." may be referred to.

Figure 7:
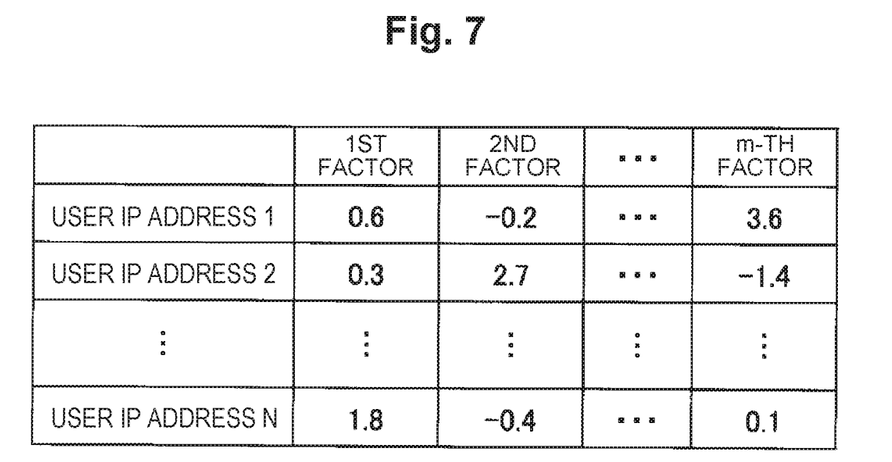
FIG. 7 is a diagram showing an example output result of a clustering approach.

FIG. 7 is a diagram showing an example output result of the clustering approach. That is, FIG. 7 shows an example of data output in step S105. As shown in FIG. 7, an output result (calculation result) of the clustering approach is a representation of relevance between user IDs and any number of factors (groups) using a two-dimensional array. FIG. 7 shows an example output result in the case of analyzing access logs of DNS queries by factor analysis. It is sufficient that the number of factors (the number of groups) m is determined by a method suitable for the clustering approach.

Figure 8:
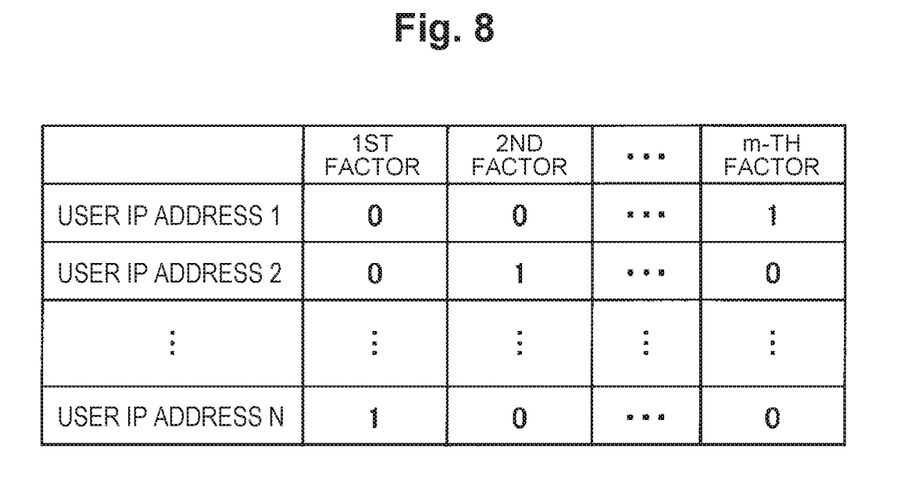
FIG. 8 is a diagram showing an example replacement result from relevance to a label.

Subsequently, the analysis unit 12 replaces each element in the two-dimensional array, which is the output result of the clustering approach, with a label based on the relevance (S106). For example, a label L(user ID, group e) of a group e that has the highest relevance in the certain user ID is set to 1, and L(user ID, the groups other than e) is set to 0. FIG. 8 shows an example result of labeling in this method.

Note that replacement of each element with a label may be omitted (e.g., this is equivalent to using the relevance directly as a label), the replacement method is also not limited to the above method. For example, the number of labels in each group is set to f (replacement with labels of $label_0$ to $label_{f-1}$), and a preset threshold $b_1$ to $b_{f-1}$ ($b_j < b_{j+1}$) may be used to set L(user ID, group w)=$label_j$ when relevance(user ID, group w)=z and bj<z<bj+1.

Thus, the analysis result is a two-dimensional array in which user IDs and groups (factors) are used as axes and an element of the array is a label as described above (see FIG. 8). Although the clustering method of user IDs based on this two-dimensional array is optional, for example, it is possible to cluster user IDs, in which labels of each group match each other, as the same cluster. In the result of clustering of user IDs, it can be said that user IDs in the same cluster have similar use patterns of services, and their terminal types are also similar.

Figure 9:
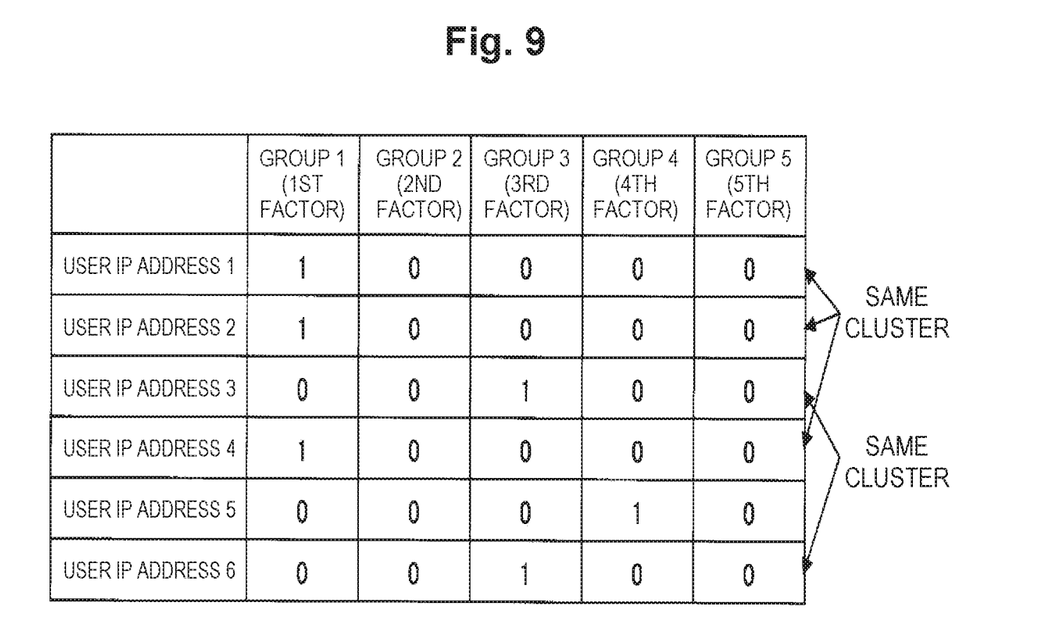
FIG. 9 is a diagram showing an example of clustering user IDs, labels of which match each other, as the same cluster.

FIG. 9 is a diagram showing an example of clustering user IDs, labels of which match each other, as the same cluster. Each element of the two-dimensional array shown in FIG. 9 is irrelevant to FIG. 7 and FIG. 8 for convenience. In the case of replacement with labels as shown in FIG. 9, for example, user IDs associated with "user IP address 1", "user IP address 2", and "user IP address 4" are classified into the same cluster. In addition, user IDs associated with "user IP address 3" and "user IP address 6" are classified into the same cluster.

Classification of user IDs that is useful for identification of the terminal types of user IDs is made possible by classifying user IDs based on correlations with used services access sources of which are the user IDs. It is possible to easily identify the terminal type of a user ID by extracting only data of a representative user ID from each cluster based on a classification result and using any learning machine. For the learning machine, for example, "Support Vector Clustering, Asa Ben-Hur, David Horn, Hava T. Siegelmann, and Vladimir Vapnik, Journal of Machine Learning Research 2, pp. 125-137, 2001." may be referred to.

Note that the sequential model (processing procedure) described in FIG. 5 can be implemented by any program language or script language or a combination thereof.

As described above, according to this embodiment, the problems in the prior literature can be solved by analyzing access logs to services, and access sources (user IDs) using similar terminal types can be clustered. By clustering, even when the number of users is very large, the behavior of the whole cluster can be grasped by tracking features of some users in a cluster. Accordingly, it is possible to assist improvement of efficiency in identifying a terminal type.

Note that in this embodiment, the analysis apparatus 10 is an example of the access source classification apparatus. The preprocessing unit 11 is an example of the first calculation unit and the extraction unit. The analysis unit 12 is an example of the second calculation unit and the classification unit.

Although the embodiment of the present invention has been described above, the present invention is not limited to such a specific embodiment, and various kinds of variants and modifications are possible within the range of the gist of the present invention described in Claims.

REFERENCE SIGNS LIST

10 analysis apparatus
11 preprocessing unit
12 analysis unit
20 traffic collection apparatus
30 user terminal
40 DNS cache server
50 content server
100 drive device
101 recording medium
102 auxiliary storage device
103 memory device
104 CPU
105 interface device
B bus

The invention claimed is:

1. An access source classification apparatus comprising:
a first calculation unit that calculates a statistic related to autonomous access to each service by each terminal type among a plurality of terminal types based on a set of access logs indicating when each terminal type accessed each service, wherein the autonomous access includes an automatic access of a service by terminals;
an extraction unit that, for each service among a plurality of services, calculates an index value indicating a statistical distribution of access status to the service for each of the terminals based on the access logs related to the service, and extracts some services from the plurality of services based on the index value calculated for each of the services, wherein the index value is calculated based on a variation of access counts or access intervals by different terminals;
a second calculation unit that calculates relevance between terminals and each service extracted by the extraction unit by applying a clustering approach that reveals groups of terminals that autonomously access one or more particular services in a similar manner as indicated by a level of similarity between index values of the services; and
a classification unit that classifies terminals that have autonomously accessed a particular service extracted by the extraction unit into a group of terminals based on the relevance between the terminals and the particular service.

2. The access source classification apparatus according to claim 1, wherein the index value is a statistical variance based on the statistical distribution of an access count to the service for each of the access sources or a statistical distribution of an access interval to the service by the access source, or is a standard deviation based on the statistical distribution, and wherein the extracted services are those services having less than a specified amount of variation in access counts or access intervals by different terminals.

3. The access source classification apparatus according to claim 1, wherein the second calculation unit applies the clustering approach to the statistic related to some services having a relatively large sum of the statistics among the plurality of services.

4. The access source classification apparatus according to claim 1, wherein the statistic is presence or absence of access to the service by the access source, an access count to the service by the access source, or a traffic amount when the access source uses the service.

5. An access source classification method, comprising the following steps executed by a computer:
   a first calculation step of calculating a statistic related to autonomous access to each service by each terminal type among a plurality of terminal types based on a set of access logs indicating when each terminal type accessed each service, wherein the autonomous access includes an automatic access of a service by terminals;
   an extraction step of, for each service among a plurality of services, calculating an index value indicating a statistical distribution of access status to the service for each of the terminals based on the access logs related to the service, and extracts some services from the plurality of services based on the index value calculated for each of the services, wherein the index value is calculated based on a variation of access counts or access intervals by different terminals;
   a second calculation step of calculating relevance between terminals and each service extracted by the extraction unit by applying a clustering approach that reveals groups of terminals that autonomously access one or more particular services in a similar manner as indicated by a level of similarity between index values of the services; and
   a classification step of classifying terminals that have autonomously accessed a particular service extracted by the extraction unit into a group of terminals based on the relevance between the terminals and the particular service.

6. The access source classification method according to claim 5, wherein the index value is a statistical variance based on the statistical distribution of an access count to the service for each of the access sources or a statistical distribution of an access interval to the service by the access source, or is a standard deviation based on the statistical distribution, and wherein the extracted services are those services having less than a specified amount of variation in access counts or access intervals by different terminals.

7. A non-transitory computer readable medium storing a program, wherein execution of the program causes one or more computers to perform operations comprising:
   calculating a statistic related to autonomous access to each service by each terminal type among a plurality of terminal types based on a set of access logs indicating when each terminal type accessed each service, wherein the autonomous access includes an automatic access of a service by terminals;
   for each service among a plurality of services, calculating an index value indicating a statistical distribution of access status to the service for each of the terminals based on the access logs related to the service, and extracts some services from the plurality of services based on the index value calculated for each of the services, wherein the index value is calculated based on a variation of access counts or access intervals by different terminals;
   calculating relevance between terminals and each service extracted by the extraction unit by applying a clustering approach that reveals groups of terminals that autonomously access one or more particular services in a similar manner as indicated by a level of similarity between index values of the services; and
   classifying terminals that have autonomously accessed a particular service extracted by the extraction unit into a group of terminals based on the relevance between the terminals and the particular service.

8. The non-transitory computer readable medium according to claim 7, wherein the index value is a statistical variance based on the statistical distribution of an access count to the service for each of the access sources or a statistical distribution of an access interval to the service by the access source, or is a standard deviation based on the statistical distribution, and wherein the extracted services are those services having less than a specified amount of variation in access counts or access intervals by different terminals.

9. The non-transitory computer readable medium according to claim 7, wherein the one or more computers apply the clustering approach to the statistic related to some services having a relatively large sum of the statistics among the plurality of services.

10. The non-transitory computer readable medium according to claim 7, wherein the statistic is presence or absence of access to the service by the access source, an access count to the service by the access source, or a traffic amount when the access source uses the service.

* * * * *